United States Patent
Nelson et al.

[11] 3,737,010
[45] June 5, 1973

[54] RETRACTABLE POST

[75] Inventors: Harold C. Nelson, Long Beach, Calif.; Richard A. Sharp, Lakewood, Colo.

[73] Assignee: McDonnell Douglas Corporation, Santa Monica, Calif.

[22] Filed: June 3, 1971

[21] Appl. No.: 149,461

[52] U.S. Cl............188/32, 119/129, 188/2 R
[51] Int. Cl.....................................B60t 1/14
[58] Field of Search..........104/254; 119/125; 188/2 R, 32; 248/354 R, 354 P, 354 S

[56] References Cited

UNITED STATES PATENTS 209,288  10/1878  Peppler..........................119/125
566,196  8/1896  Lewis..............................119/125
3,157,249  11/1964  Laverone et al................188/32

FOREIGN PATENTS OR APPLICATIONS 284,415  5/1915  Germany........................119/125

Primary Examiner—Duane A. Reger
Attorney—Walter J. Jason, Donald L. Royer and Robert O. Richardson

[57] ABSTRACT

A floor mounted retractable post to restrain a serving cart in an aircraft in areas where a fixed post protruding above the floor would present a hazard. A spring-loaded, flush-mounted post is extendible by manual manipulation and is maintained flush with the floor upon depression when not in use.

6 Claims, 3 Drawing Figures

Patented June 5, 1973 3,737,010

INVENTORS
HAROLD C. NELSON
RICHARD A. SHARP
BY
ATTORNEY 3,737,010

RETRACTABLE POST

BACKGROUND OF THE INVENTION

Many existing passenger-carrying aircraft use serving carts to deliver food, drink and other necessities to the passengers. The serving carts are also used as service carts to return food, serving items, and other used or soiled articles to the galleys. The serving carts are pushed by stewards or stewardesses up and down the aisles in the aircraft. The serving carts have hand-operated wheel brakes but their weight, which is in excess of 200 pounds, high center of gravity and narrow width provide a serious passenger damage potential should the aircraft deviate from a smooth, level flight or the cart is jostled aside by a passenger or airline personnel.

Fixed posts extend above the floor in certain non-passenger areas. These service carts may be attached to them as needed. However, fixed posts above the floor in the passenger compartments and aisles when not in use present a hazard to passengers and airline personnel. Hence, a retractable flush-mounted post is desirable in these areas.

SUMMARY OF THE INVENTION

This invention relates to a retractable post which operates as a restraint for a serving cart in an airplane to eliminate the hazard to passengers from a cart moving or tipping. The restraint post is flush with the airplane floor carpet when not in use but can be extended upwardly to a use position from its retracted position by a manual upward pull on the handle. This handle is attached to the post and is flush-mounted in the floor. A housing is rigidly mounted in the aircraft floor so that the top surface of the post will be flush with the carpet when the post is in the retracted position but which may be extendible to a height above the floor sufficient to be clamped with a serving cart that may be positioned thereover.

The inside wall surfaces of the housing is shaped to act as a cam surface. The spring and ball detent in the base of the post exerts an outward force against the cam surface when the post is in the extended position to hold the post firmly in the extended position against the housing. With the post in a retracted position the spring and ball engages another cam surface on the housing to exert a downward force which holds the post head firmly against the bumper in the housing. These restraints are installed in all aircraft areas where serving carts are required and which is used also for passenger egress or ingress.

For such a device to be practical for aircraft use, it must be lightweight and yet sufficiently strong to withstand heavy loading applied from the serving cart and its contents from an emergency condition and transfer that load into the airplane structure. The device must not present a hazard to the passenger walking up the aisle and therefore the device must retract into a housing in the floor. It must be easily extended and retracted, endure long-term repeated action, be easily installed, removed or replaced. It must be sealed against dirt and spilled liquids, and operates smoothly under all conditions, and, lastly, it must have an acceptable appearance as it is part of the aircraft interior.

DETAILED DESCRIPTION OF ILLUSTRATIVE EMBODIMENTS

Figures 1, 2:
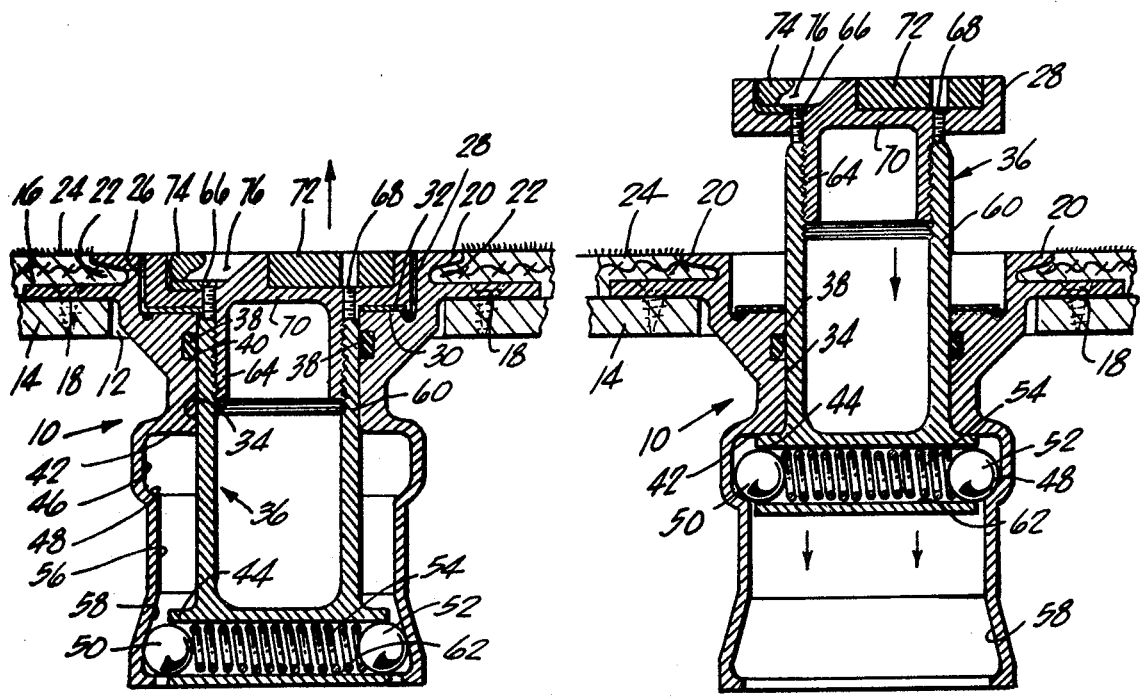
FIG. 1 is a sectional view in elevation illustrating the post in the retracted or stored position.
FIG. 2 is a sectional view in elevation illustrating the post in the extended or use position.
Figure 3:
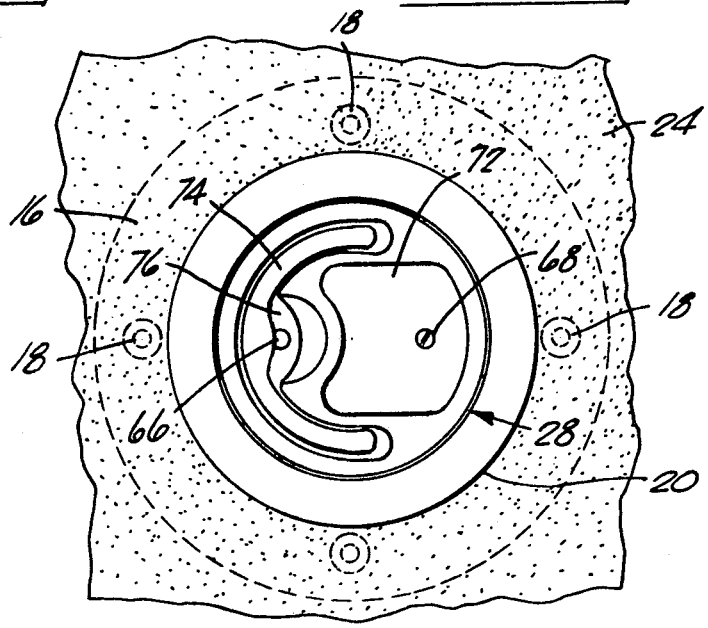
FIG. 3 is a plan view showing the post mounted on the floor.

Reference is now made to the drawings wherein is shown a housing 10 adapted to fit within an opening 12 in a floor 14. This housing has a flange or collar portion 16 having apertures therein for the insertion of screws 18 into the floor 14 for the mounting thereof. Extending upwardly above the collar 16 is a carpet retainer ring 20 which extends outwardly over the edge 22 of carpet 24 on floor 14.

Housing 10 has a cylindrical wall of varied inner diameter extending down into the opening 12. Commencing with the upper inner surface wall 26 which is of sufficient diameter to receive the head assembly 28 of the retractable post 36, such surface then turns inwardly to form a seating surface 30 upon which a bumper material 32 is cemented and upon which the head assembly 28 is seated when in the retracted position. The inner wall then extends downwardly forming a cylindrical surface 34 of sufficient size to receive the post 36. A molded seal 38 fits within an annular groove 40 within this wall surface 34. Extending downwardly the inner wall surface extends outwardly to form a shoulder 42 which serves as an upper stop limit when engaged by an outward projecting portion 44 at the lower end of the shaft 36. The inner wall surface then extends downwardly at 46 and thence inwardly at 48 to form a cam against which balls 50 and 52 are outwardly urged by spring 54. This camming action causes the outward projecting portion 44 of shaft 36 to engage shoulder 42 of the housing and be continuously urged upwardly to thus prevent rattle or vibration in the uppermost position of the post. The inner surface of the annular wall of housing 10 then extends downwardly at 56 and then flares outwardly at 58 to form a bell housing. This outwardly flared portion 58 then provides a cam surface against which the balls 50 and 52 are urged when the post is in its downward position. This surface 58 urges the post 36 downwardly and hence avoids rattle or vibration in the downward position.

Post 36 consists of a shaft 60 to which is detachably mounted the head assembly 28. The shaft is of uniform outside cylindrical configuration for movement against molded seal 38 in wall 34 of the housing 10. At the bottom of the shaft 60 is a horizontal transverse cylindrical bore 62 in which is positioned a helical compression spring 54 urging outwardly the balls 50 and 52 positioned at each end of the spring.

The head assembly 28 has a downwardly extending threaded cylindrical member 64 telescopically engageable with shaft 60. A pair of set screws 66, 68 pass through the base portion 70 of the head assembly 28 and engage the upper end of the shaft 60 for adjustment purposes. When in the down position the base portion 70 of the head assembly 28 engages the bumper 32 on the shoulder 30 of the housing 10 and thus limit the downward movement. This adjustment is such that the balls 50 and 52, urged outwardly by spring 54, engage the cam surface 58 of the housing and thus urge the post 36 downwardly in a snug, non-vibrating or rattle condition.

Mounted on the upper surface of the base portion 70 of the head assembly 28 is a molded pad 72 and a pivotally mounted handle 74 mounted within recess 76. Handle 74 does not pivot upwardly a full 90° so that when it is released it will fall back with its upper surface flush with the upper surface of the base portion 70.

In operation, to lift the post 36 up to its use position the handle 74 may be manually engaged by the operator and pulled upwardly. To return the post 36 to its non-use position, the operator simply steps down on the molded pad 72.

Having thus described an illustrative embodiment of the present invention, it is to be understood that modifications thereof will become apparent to those skilled in the art and it is to be understood that these deviations are to be construed as part of the present invention.

We claim:

1. A retractable post assembly for vertical movement of a post between a retractable position within a housing and an extended position above the housing, said assembly comprising:
   a post housing adapted to be mounted in an opening in the floor,
   said housing having an annular opening in the top thereof,
   said opening extending downwardly and having a varied inner diameter,
   a post having a head assembly with a flat undersurface and a shaft, said head assembly being of a larger diameter than the shaft of said post,
   said opening having an inner cylindrical wall surface of sufficient diameter to receive the head of said post therein for flush mounting thereof,
   said inner wall surface having a turned in horizontal seating surface for said head assembly to limit downward movement of said post,
   said inner wall surface having a turned out surface forming a shoulder, said post having an outward extension integral therewith and engageable with said shoulder to limit upward vertical movement of said post relative to said housing.

2. A retractable post assembly as set forth in claim 1, said post having wall engageable means outwardly urged,
   said inner wall surface having a cam surface engageable by said wall engageable means to urge said post outward extension into contact with said shoulder when said post is in its extended position.

3. A retractable post assembly as set forth in claim 2, said post outward extension being on the lower end thereof and having a bore with a helical compression spring therein,
   said wall engageable means being at each end of said spring and outwardly urged thereby.

4. A retractable post assembly as set forth in claim 1, said post having outwardly urged wall engageable means thereon,
   said inner wall surface having a bell shaped configuration at the lower end thereof,
   said outwardly urged wall engageable means being in contact with said bell shaped configuration when said post is in its retractable position to thereby urge said post head assembly into engagement with said turned in seating surface.

5. A retractable post assembly as set forth in claim 1, said head assembly having a handle flush mounted therein,
   said handle being pivotal from horizontal to less than 90° vertical for manual withdrawal of said post from retractable position to extended position,
   said handle returning to horizontal upon manual release thereof.

6. A retractable post assembly as set forth in claim 1, said post having wall engageable means outwardly urged,
   said inner wall surface having a first cam surface engageable by said wall engageable means to urge said post outward extension into contact with said shoulder when said post is in its extended position,
   said inner wall surface having a second cam surface thereof engageable with said wall engageable means to urge said head assembly against said seating surface when said post is in its retractable position.

* * * * *